March 20, 1945. C. O. HALVERSON 2,371,617
STOCK FEEDER
Filed Aug. 7, 1942 2 Sheets-Sheet 2
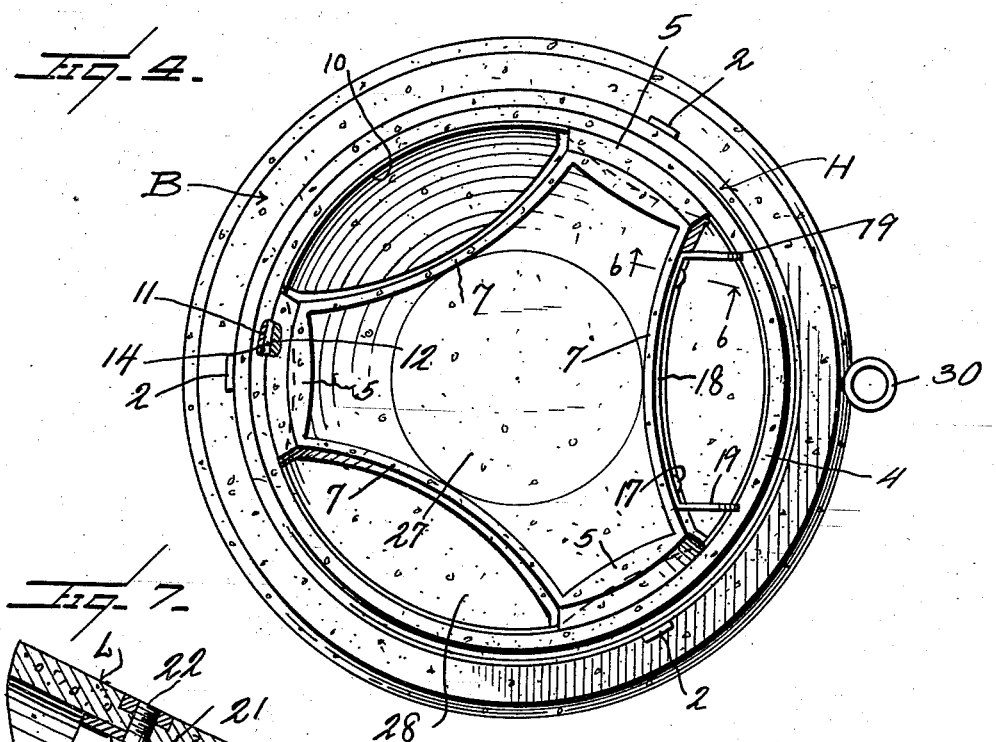
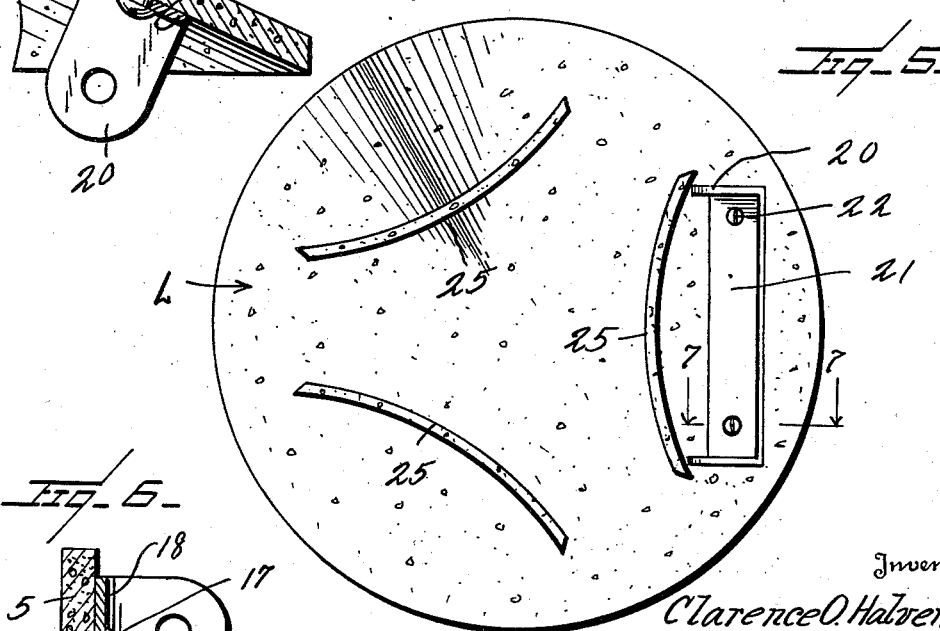
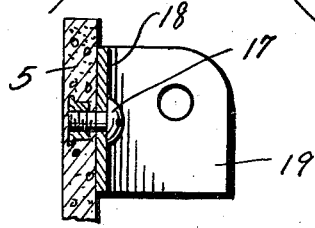
Inventor
Clarence O. Halverson
By Coleman & Lawson
Attorneys Patented Mar. 20, 1945

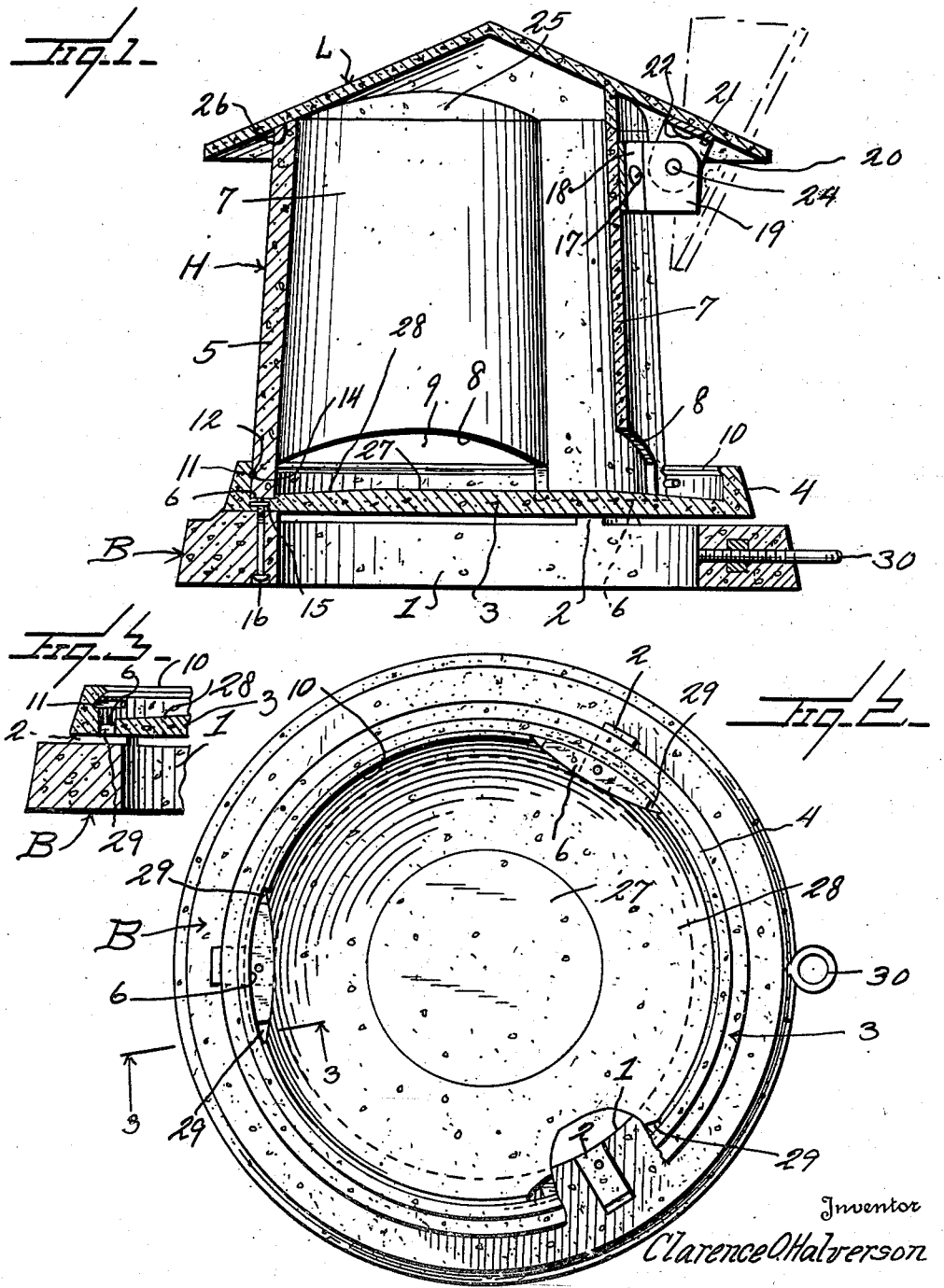

2,371,617

UNITED STATES PATENT OFFICE 2,371,617

STOCK FEEDER

Clarence O. Halverson, Mason City, Iowa

Application August 7, 1942, Serial No. 454,005

5 Claims. (Cl. 119—52)

This invention relates to a stock feeder and has relation more particularly to a device of this kind particularly adapted for use in the feeding of salt and minerals in the pasture or stockyard, and it is primarily an object of the invention to provide a feeder of this kind wherein the material to be fed, such as the salt or mineral, can be readily placed in bulk within the feeder and wherein the feeder is so constructed as to effectively protect the content against the elements.

Another object of the invention is to provide a feeder of this kind which is so constructed as to substantially eliminate waste and particularly at the time the animal is consuming the content of the feeder.

An additional object of the invention is to provide a feeder of this kind which in its construction is substantially free of metal and wherein the material used is of a character to effectively withstand the elements, whereby the life of the feeder is materially prolonged and wherein the device, as the result of such material, is of a weight to be effectively maintained in the position desired and against shifting by the animal or by the wind.

A still further object of the invention is to provide a feeder of this kind especially designed and adapted for use in connection with salt or mineral and wherein the feeder is of a type wherein the salt or mineral placed therein is entirely free of contact with metal or any other material which would otherwise result in deterioration of the device.

The invention also contemplates for an object to provide a device of this kind which will readily maintain its position in its intended location and wherein the device is maintained in its applied position against tipping or tilting and with the further advantage of effectively protecting the content of the feeder against waste and against the elements and particularly rain and snow.

As a further object the invention provides a device of this kind comprising several different parts which can be readily assembled and applied and wherein the parts, when assembled, are in such relative arrangement as to allow such air circulation to assure the content of the feeder, under normal conditions, to be maintained in a dry state.

An additional object of the invention is to provide a feeder of this kind for use in connection with salt and mineral and wherein the structure is such that in consuming such salt or mineral the animal consumes the same from the lower portion of the content of the feeder and in a manner to assure the consuming of the entire content of the feeder.

The invention consists in the details of construction and in the combination and arrangement of the several parts of my improved stock feeder whereby certain important advantages are attained, as will be hereinafter more fully set forth.

In order that my invention may be better understood, I will now proceed to describe the same with reference to the accompanying drawings, wherein:

Figure 1 is a vertical sectional view taken through a feeder constructed in accordance with an embodiment of my invention, an open position of the lid or cover being indicated by broken lines.

Figure 2 is a view in top plan of the bottom member of the hopper with a portion broken away.

Figure 3 is a detailed sectional view on the line 3—3 of Figure 2.

Figure 4 is a view in top plan of the feeder with the lid or cover removed.

Figure 5 is a view in bottom plan of the lid or cover unapplied.

Figure 6 is a detailed sectional view taken substantially on the line 6—6 of Figure 4, and Figure 7 is a detailed sectional view taken substantially on the line 7—7 of Figure 5.

As disclosed in the accompanying drawings, B denotes a heavy and thick base member annular in form defining a relatively large central opening 1. This base member B is made of cementitious material and at predetermined points therearound this base member B is provided with the upstanding spacer lugs 2 integrally formed therewith and extending radially of the base member B. In the present embodiment of the invention these lugs 2 are three in number and equidistantly spaced around the member B.

Superimposed upon the base member B is a hopper H and this hopper H includes a circular bottom member 3 of desired radius and of considerable thickness and weight. This bottom member 3 has direct contact from above with the lugs 2. This bottom member 3 is also of cementitious material and the lugs 2 space this bottom member 3 above the base member B a distance sufficient to allow a free circulation of air under the applied bottom member 3 and thereby facilitate the maintaining of said bottom member 3 in a dry condition. This bottom member 3 has its margin defined by an upstanding flange 4 whereby the bottom member 3 constitutes a pan-like element of desired depth.

The body of the hopper H is also made of cementitious material and comprises a series of circumferentially spaced and relatively broad posts 5. These posts 5 are herein disclosed as three in number and, as is particularly illustrated in Figures 1 and 4, each of these posts is of such cross sectional configuration as to have their lower end portions in close contact with the inner face of the flange 4 and snugly received within the suitably positioned pockets or depressions 6 provided in the upper face of the bottom member 3 immediately adjacent to the flange 4. This fitting of the lower end portions of the posts 5 within these pockets or depressions 6 assures the body of the hopper H being non-rotatably held in desired position upon the bottom member 3. As illustrated in Figure 4, each of these posts 5 is of material thickness to assure the same having proper strength.

Each pair of adjacent posts 5 is connected by the inwardly curved intermediate walls 7 disposed on an inward curvature, whereby the bottom member 3 between the posts 5 is provided exteriorly of the body of the hopper H with areas sufficient to enable stock to have desired access to the salt or mineral content of the hopper H.

Each of the walls 7 terminates a material distance above the lower ends of the posts 5 and the lower margin or edge 8 of each of these walls 7 is disposed on an upward curvature, as particularly illustrated in Figure 1, whereby is provided an opening 9 extending entirely across the lower portion of the wall 7 to enable the stock to have sufficient access to the content of the hopper H to lick or lap out such content to the core thereof. This opening 9 is of a comparatively low height with respect to the bottom of the hopper so that the stock can only have access to the lower portion of the content of the hopper.

As illustrated in the drawings, the posts 5 together with the walls 7 are disposed on an upward and inward taper, so that in a general sense the body of the hopper is in the form of a truncated cone with the smaller end upwardly disposed. As the cattle lick or lap out the content of the lower portion of the hopper to the core of such content, the upward and inward taper of the posts 5 and walls 7 will readily allow such content to drop, thus assuring a feeder which is non-clogging and of a type whereby the entire content may be used up.

Furthermore, it is to be pointed out that the particular construction of the body of the hopper is such as to permit the salt or mineral to be placed in bulk within the hopper, as the material in bulk can be readily applied within the body of the hopper through the upper open end thereof.

The flange 4 of the bottom member 3 at its upper marginal portion is provided with the inwardly disposed lips 10, herein disclosed as substantially V-shaped in cross section, with the apices thereof inwardly directed. These lips 10 are each of a length to extend between adjacent pockets or depressions 6 or between adjacent lugs 5 of the applied body of the hopper, whereby effective means is provided to prevent waste of the salt or mineral by the stock. It is believed to be obvious that these lips 10 serve as guards to prevent scattering of the content out from the bottom member 4.

The inner face of the flange 4 above each of the pockets or depressions 6 is provided with a circumferentially disposed groove or channel 11 which registers with a groove or channel 12 disposed transversely across the post 5 fitting within the adjacent pocket or depression 6. These grooves or channels 11 and 12 are substantially semi-circular in cross section so as to permit a strand 14 of wire to be threaded into the registering grooves or channels 11 and 12 to positively lock the body of the hopper to the bottom member 3.

Embedded in the bottom member 3 below each of the pockets or depressions 6 is a nut 15 through which threads an elongated bolt 16 inserted from below through the base member B whereby the bottom member 3 is effectively held to the base member B.

Bolted, as at 17, to the upper portion of one of the walls 7 is a transversely disposed plate 18, the extremities of which are provided with the outstanding ears 19 which are overlapped by the outstanding ears 20 carried by the end portions of the elongated plate 21 secured, as at 22, to the inner face of the lid or top member L adjacent to the periphery thereof. These overlying ears 19 and 20 are pivotally connected, as at 24, whereby the lid or top member L may be readily swung from closed position, as illustrated in full lines in Figure 1, to an open position entirely to one side of the bottom of the hopper, as illustrated by broken lines in Figure 1, and vice versa. The extent of opening movement of the lid or top member L is limited by contact of a portion of said lid or member L with the ears 19.

This lid or top member L is also made of cementitious material and is conical in form with its apex, of course, upwardly disposed. This lid L is of such diameter as to extend entirely over the body of the hopper and also the bottom member 3 when in closed position, so that content of the hopper is effectually protected against the elements and particularly against moisture.

The lid member L at required points therearound is provided with the depending flanges 25 of such form as to bring each of such flanges 25 in close contact from above with the upper edge of a wall 7 and each of these flanges 25 is of a length coextensive in length with its associated wall 7, so that when the lid L is closed there is no open space between the top of each wall 7 and the lid L proper. When the lid L is in its fully closed position, it has direct contact from above with the upper ends of the posts 5 and the upper end 26 of each of said posts 5 is outwardly and downwardly beveled to assure effective contact between the closed lid member L and the post.

The central area 27 of the top surface of the bottom member 3 is flat and the top surface 28 surrounding said surface 27 is outwardly and downwardly curved so that any moisture received upon the bottom member 3 and outwardly of the wall 7 will drain toward the surrounding flange 4 and out through the drain openings 29 at the extremities of the pockets or depressions 6 and which drain openings pass entirely through the bottom member 3.

It is to be noted, as clearly illustrated in Figure 4 of the drawings, that each of the walls 7 is curved on a radius to have the central portion thereof substantially tangential to the central area 27 of the top surface of the bottom member 3.

In view of the foregoing, it is pointed out that the complete device is constructed in a manner wherein a minimum amount of metal is employed and wherein the structure is such that no metal whatever is exposed within the hopper so that deterioration of the structure will not result by contact of the salt or mineral content with any metal parts. It is also to be pointed out that the device as a whole is constructed substantially entirely of cementitious material, resulting in a heavy structure which will readily maintain itself in desired location in a pasture and which will effectively resist tipping over or tilting by wind or by the stock.

To facilitate the transporting of the device from one location to another, the base member B has secured thereto an outstanding eye member 30 to provide means whereby a tractor or a team may be readily hitched to the base member to draw the feeder from place to place as may be required.

However, in shipping the device, the various parts can be readily separated to facilitate such transportation as it is believed to be obvious from the foregoing description and the illustration in the accompanying drawings that the various parts of the device may be easily assembled.

From the foregoing description it is thought to be obvious that a stock feeder constructed in accordance with my invention is particularly well adapted for use by reason of the convenience and facility with which it may be assembled and operated.

What is claimed is:

1. A stock feeder comprising a flat base member of molded material having a central opening, upstanding lugs forming a part of the top of the base member at points spaced therearound and a hopper including an imperforate bottom wall resting upon, and maintained spaced from the base by, the lugs, said bottom wall overlying the central opening of the base member, and a separable side member resting upon the bottom member and having an opening in its lower edge to permit access by an animal to the contents of the hopper.

2. A feeder of the class described comprising a circular hopper of molded material including an imperforate bottom member, an upstanding marginal flange carried by the bottom member and a separable hopper body member resting from above upon the bottom member, portions of the wall of the body member at points therearound being set in from the flange, the lower edges of the inwardly disposed portion being cut away to allow access into the hopper, the parts of the wall between the inset portions being of greater thickness than the inset portions, the lower extremities of said parts constituting supporting legs for the body of the hopper, the bottom member being provided in its upper face adjacent the flange with upwardly facing pockets in which the legs are received.

3. A stock feeder comprising a flat heavy base having a central opening and having radial upstanding ribs upon its top, a hopper comprising a flat bottom of circular outline resting upon said ribs to provide space thereby between the top of the base and the flat bottom and overlying the opening, the bottom including an upstanding peripheral flange, and a vertical wall of generally circular outline of an overall diameter to set inside said flange and rest upon said bottom, said wall having inpressed portions spaced at the lower ends from the flange to form feed troughs, the bottom edges of the inpressed wall portions being cut away for the flow of feed into the troughs, the portions of the wall between the inpressed portions being in locking connection with said flange, and a cover overlying the wall portion of the hopper.

4. A feeder structure as set forth in claim 3, in which the said portions of the wall between the inpressed portions are of thicker construction than the inpressed portions forming supporting posts, the said locking connection between the flange and the stated portions of the body comprising coacting recesses in the opposing faces of the flange and post portions, and key members removably positioned in the coacting recesses.

5. A stock feeder comprising a flat circular bottom having an upstanding peripheral flange, an upstanding substantially cylindrical body opened at its bottom and resting upon the bottom within the flange and engaging with the flange at spaced points around the body, the portions of the body between the flange engaging points being arcuately curved inwardly and forming feeding troughs with the opposing portions of the flange, the bottom edges of the inwardly curved portions being cut away to form discharge openings leading from within the body to the troughs, a cover overlying the top of the body, and means detachably coupling the body and the flange where the body engages the inside of the flange.

CLARENCE O. HALVERSON.